United States Patent

Iwata et al.

[11] Patent Number: 5,991,129
[45] Date of Patent: Nov. 23, 1999

[54] DISC CARTRIDGE WITH SLIDABLE SHUTTER

[75] Inventors: Hirokimi Iwata, Ibaragi; Yoshikazu Ishimatsu, Kanagawa, both of Japan

[73] Assignee: Sony Corporation, Japan

[21] Appl. No.: 08/177,347

[22] Filed: Jan. 4, 1994

Related U.S. Application Data

[63] Continuation of application No. 07/584,178, Sep. 18, 1990, abandoned.

[30] Foreign Application Priority Data

Oct. 6, 1989 [JP] Japan .................................. 1-261687

[51] Int. Cl.⁶ .................................................. G11B 23/03
[52] U.S. Cl. .............................................................. 360/133
[58] Field of Search ............................ 360/133; 206/444; 369/291

[56] References Cited

U.S. PATENT DOCUMENTS

| | | | |
|---|---|---|---|
| 4,849,844 | 7/1989 | Kato ........................................ | 360/133 |
| 4,853,925 | 8/1989 | Kaneuchi ................................ | 360/133 |
| 4,876,619 | 10/1989 | Suzuki .................................... | 369/291 |
| 4,908,726 | 3/1990 | Kato ........................................ | 369/291 |
| 4,908,817 | 3/1990 | Sandell et al. .......................... | 360/133 |
| 4,943,880 | 7/1990 | Muehlhausen et al. ................. | 360/133 |
| 4,945,530 | 7/1990 | Sandell et al. .......................... | 360/133 |
| 4,991,048 | 2/1991 | Ikebe et al. ............................. | 360/133 |
| 5,051,857 | 9/1991 | Akiyama ................................. | 360/133 |

FOREIGN PATENT DOCUMENTS

| | | | |
|---|---|---|---|
| 0164647 | 12/1985 | European Pat. Off. . | |
| 0218231 | 4/1987 | European Pat. Off. ............... | 360/133 |
| 0236100 | 9/1987 | European Pat. Off. . | |
| 0402037 | 12/1990 | European Pat. Off. ............... | 369/291 |
| 59-72687 | 4/1984 | Japan ................................. | 360/133 A |
| 60-167158 | 8/1985 | Japan ..................................... | 360/133 |
| 61-82395 | 4/1986 | Japan ..................................... | 360/133 |
| 61-104382 | 5/1986 | Japan ..................................... | 360/133 |
| 62-14389 | 1/1987 | Japan ..................................... | 360/133 |
| 63-91885 | 4/1988 | Japan ..................................... | 360/133 |

*Primary Examiner*—Allen T. Cao
*Attorney, Agent, or Firm*—Ronald P. Kananen; Rader, Fishman & Grauer

[57] ABSTRACT

A disc cartridge is comprised of a cartridge body for rotatably accommodating therein a disc and which has an opening portion from which the disc is partially exposed to the outside, and a shutter slidably attached to the cartridge body for opening and/or closing the opening portion, wherein the shutter is provided with first and second guide members, the first guide member is engaged with a first guide groove formed on a major surface of the cartridge body and the second guide member is engaged with a second guide groove formed on a side wall of the cartridge body. Thus, the shutter can be prevented from being disengaged from the cartridge body inadvertently or unintentionally. Further, in its opening and/or closing operation, the shutter can smoothly open and/or close the opening portion without being shaked.

12 Claims, 5 Drawing Sheets

DISC CARTRIDGE WITH SLIDABLE SHUTTER

This application is a continuation of application Ser. No. 07/584,178 filed Sep. 19, 1990, now abandoned.

BACKGROUND OF THE INVENTION

1. Field of the Invention

The present invention generally relates to disc cartridges and, more particularly, is directed to a disc cartridge which can be recorded and/or reproduced while accommodating therein a disc-shaped record medium such as a magneto-optical disc or the like.

2. Description of the Prior Art

Japanese Utility Model Application Nos. 1-22572 and 1-63698 describe disc cartridges in which an optical disc is rotatably accommodated and in which a signal can be written in and/or reproduced from the optical disc accommodated by an optical pickup head device.

In these previously-proposed disc cartridges, an opening portion is provided to expose one portion of the accommodated optical disc in order to write and/or read out (i.e., record and/or reproduce) a signal therein and/or therefrom by the optical pickup head device. Also, a shutter is provided to close the above-mentioned opening portion so that foreign substances, dusts or the like can be prevented from entering the disc cartridge or that the surface of the optical disc can be protected from being touched with fingers, hands or the like.

The shutter is provided with a guide member and the guide member is engaged with a guide groove formed on a cartridge body, whereby the shutter can be slidably moved in the direction of the opening portion along the guide groove. Further, the shutter is spring-biased by a force of a spring member so that it always closes the opening portion. Thus, when the disc cartridge is not in use, the opening portion is held in its closed state. When the disc cartridge is loaded on a recording and/or reproducing apparatus, the shutter is opened by a shutter releasing mechanism of the recording and/or reproducing apparatus against the spring-biasing force of the spring member, whereby the opening portion is opened thereby to allow the accommodated optical disc to be exposed to the outside.

In the thus constructed disc cartridge, the shutter slidably attached thereto to open and/or close the opening portion of the cartridge body is formed by punching and bending a metal thin plate such as a stainless steel plate or the like in accordance with a configuration of the opening portion or the like.

When the shutter is formed, its closing surface portion corresponding to the opening portion, the guide member and the engaging member engaged with the spring member are also formed simultaneously. In that case, the guide member is formed by bending a narrow plate member whose width is considerably small as compared with the closing surface portion so that the guide member has such a configuration that is very weak for an external force. Thus, the guide member is easily deformed to the outside, or the guide member tends to stretch regardless of the bending-process. There is then the substantial disadvantage that the guide member will be disengaged from the guide groove formed on the cartridge body, thus urging the shutter to be disengaged from the cartridge body unintentionally.

In the disc cartridge in which the shutter is provided with only one guide member, the shutter is easily shaked when it is slidably moved relative to the cartridge body to open and/or close the opening portion so that the shutter cannot be opened and/or closed smoothly.

Further, in the previously-proposed disc cartridge described in Japanese Utility Model Application No. 1-63698, the shutter is provided with a pair of guide members so that the shutter can be smoothly slid relative to the cartridge body. In that case, however, the two guide members of the shutter are inserted into and engaged with guide grooves formed on the major surface of the cartridge body and these guide grooves are formed along the front edge of the major surface of one part (or half) of the cartridge body. For this reason, the thickness of the major surface at its portion where the guide grooves are formed is reduced considerably so that a mechanical strength of the cartridge body is decreased. Particularly, when this type of disc cartridge is loaded on a recording and/or reproducing apparatus, there is the substantial risk that the disc cartridge will be damaged by a shock applied thereto through the shutter.

Furthermore, the configuration of the shutter itself is very complicated and needs a cumbersome manufacturing-process, which unavoidably increases a manufacturing cost of the disc cartridge.

OBJECTS AND SUMMARY OF THE INVENTION

Accordingly, it is an object of the present invention to provide an improved disc cartridge which can substantially eliminate the aforenoted shortcomings and disadvantages of the prior art.

More particularly, it is an object of the present invention to provide a disc cartridge in which a shutter can be prevented from being disengaged from a cartridge body inadvertently or unintentionally.

Another object of the present invention is to provide a disc cartridge in which a shutter can be opened and/or closed stably and smoothly.

Still another object of the present invention is to provide a disc cartridge in which a disc can be positively accommodated without decreasing a mechanical strength of a cartridge body.

A further object of the present invention is to provide a disc cartridge by which satisfactory recording and/or reproducing operation can be assured.

Still a further object of the present invention is to provide a disc cartridge which can be simplified in construction.

Yet a further object of the present invention is to provide a disc cartridge which can be made at low cost.

In accordance with an aspect of the present invention, a disc cartridge is comprised of a cartridge body for rotatably accommodating therein a disc and which has opening portions from which the disc is partially exposed to the outside, and a shutter slidably attached to the cartridge body for opening and/or closing the opening portions, wherein the shutter is provided with first and second guide members, the first guide member is engaged with a first guide groove formed on a major surface of the cartridge body and the second guide member is engaged with a second guide groove formed on a side wall of the cartridge body. Thus, the shutter can be prevented from being disengaged from the cartridge body inadvertently or unintentionally. Further, in its opening and/or closing operation, the shutter can smoothly open and/or close the opening portions without being shaked.

The above, and other objects, features and advantages of the present invention will become apparent from the following detailed description of illustrative embodiment thereof to be read in conjunction with the accompanying drawings, throughout which like references designate the same elements and parts.

BRIEF DESCRIPTION OF THE DRAWINGS

The accompanying drawings show the preferred embodiment of the present invention in which.

DETAILED DESCRIPTION OF THE PREFERRED EMBODIMENT

An embodiment of a disc cartridge according to the present invention will now be described with reference to the accompanying drawings.

Figure 4:
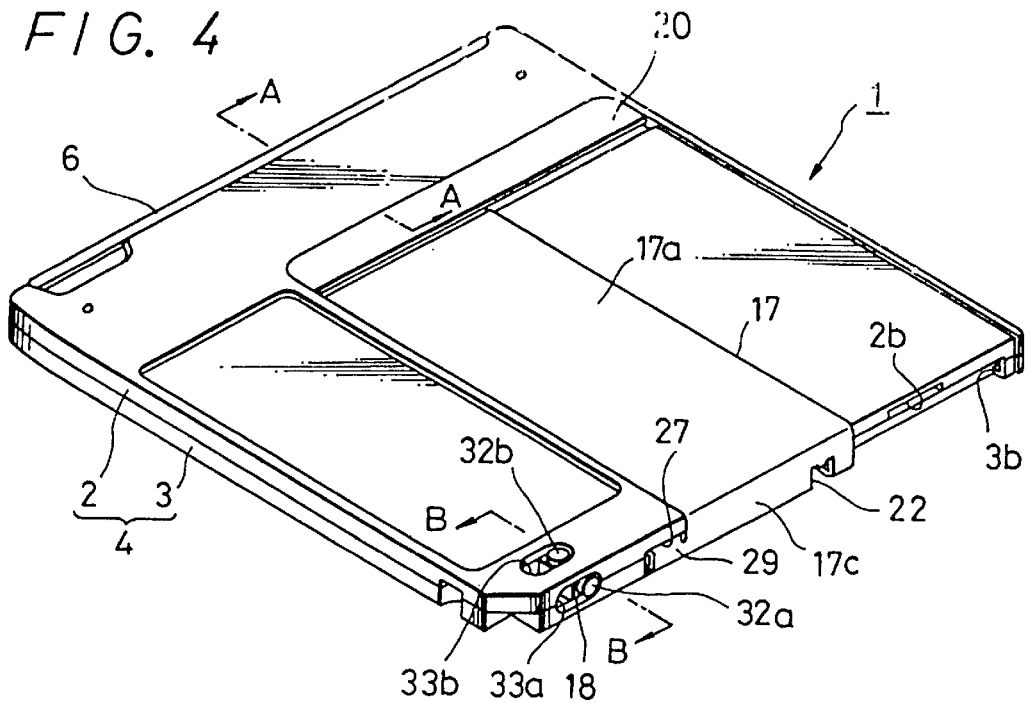
FIG. 4 is a perspective view of the same embodiment of the disc cartridge according to the present invention, and illustrating the front view.
Figure 5:
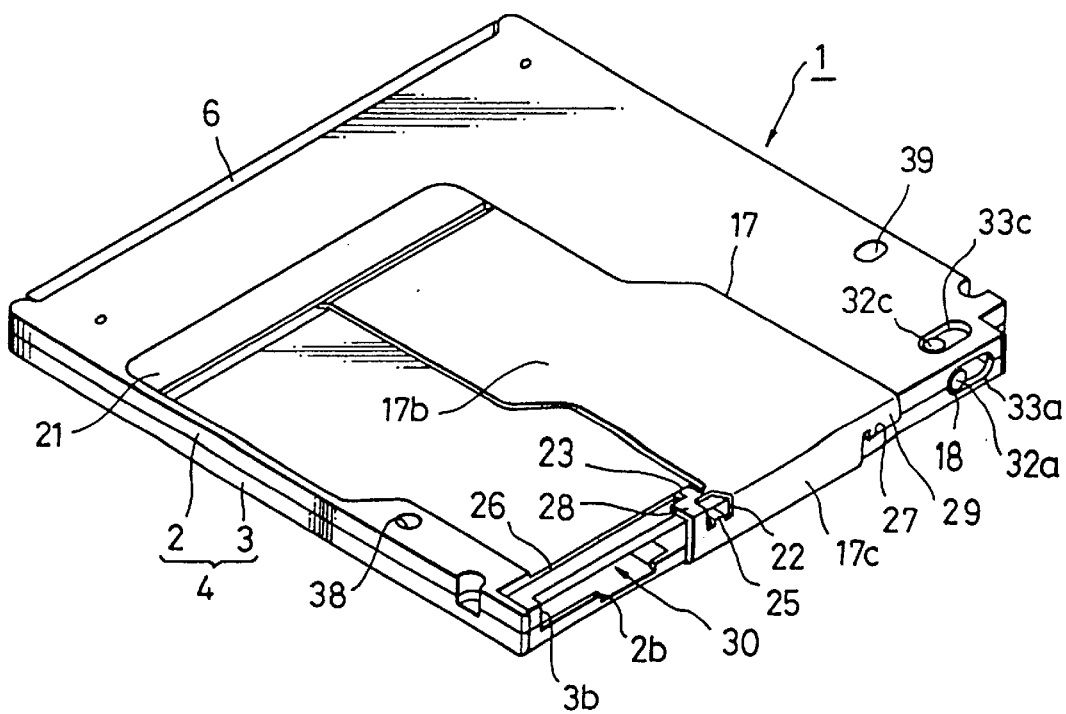
FIG. 5 is a perspective view illustrating the same from the rear view.

As illustrated, for example, in FIGS. 4 and 5, there is provided a disc cartridge 1 which is mainly comprised of a cartridge body 4. The cartridge body 4 is constructed by securing together an upper half or upper part 2 and a lower half or lower part 3, each of which is made of a synthetic resin and is shaped as a substantially flat and square plate. A magneto-optical disc (will be referred to hereinafter as an optical disc) D is accommodated within the cartridge body 4 as a disc-shaped record medium so as to become freely rotatable. The upper and lower parts 2 and 3 are fastened and coupled together by a welding-process or the like. The optical disc D is inserted into the cartridge body 4 from a mouth portion formed at the rear surface portion of the cartridge body 4, and the mouth portion 5 is closed by a lid 6 as shown in FIG. 6.

Figure 6:
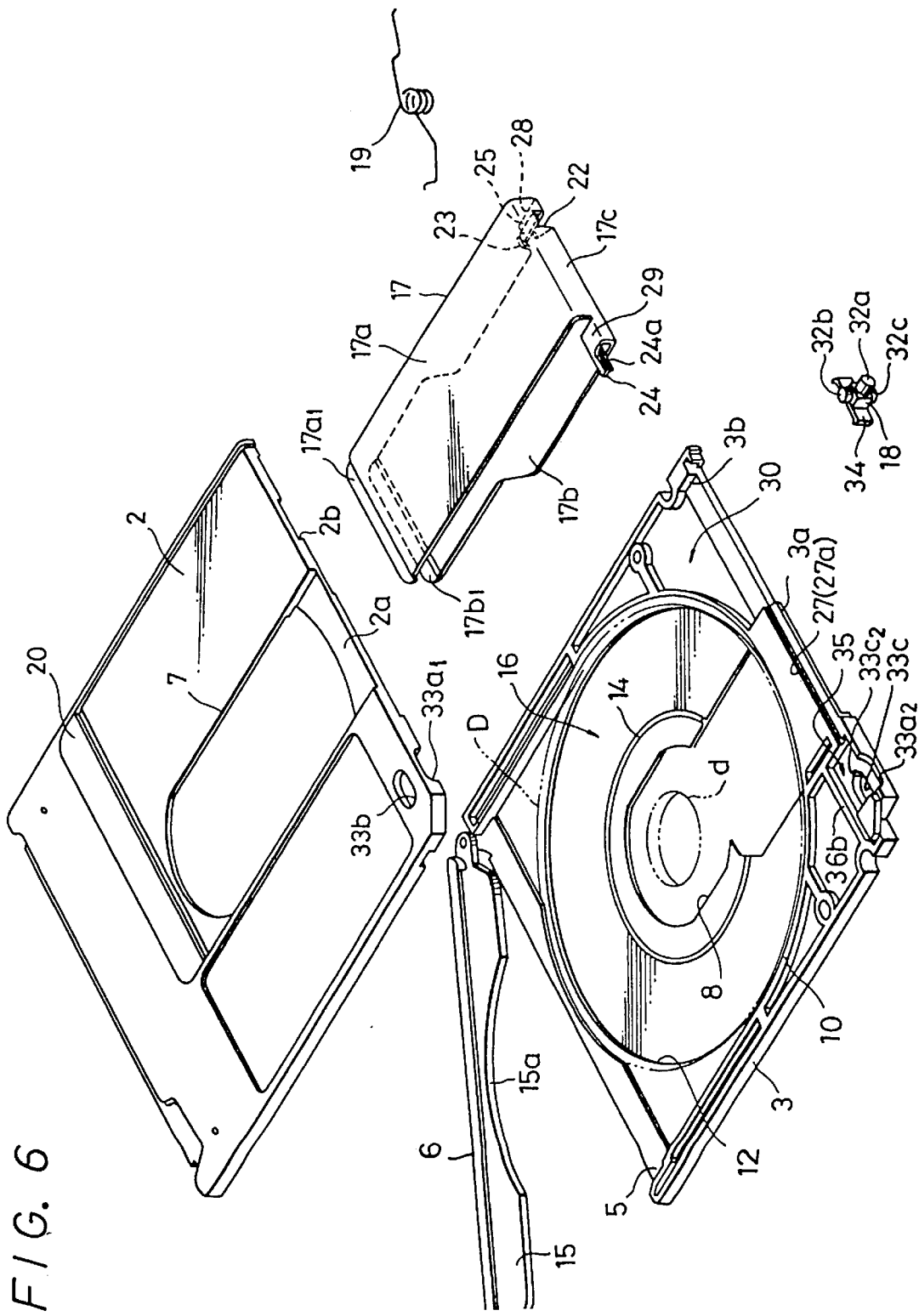
FIG. 6 is a perspective view illustrating the same in an exploded state.

As shown in FIG. 6, opening portions 7 and 8 are respectively formed through the upper and lower parts 2 and 3 from a central portion corresponding to a central aperture d of the optical disc D to one side of the cartridge body 4, i.e., front surface portions of the upper and lower parts 2 and 3. From the opening portions 7 and 8, surface portions of the optical disc D are exposed to the outside. Within the inside sides of the opening portions 7 and 8, a chucking plate (not shown) is inserted into the opening portion 7 of the upper part 2, and a turntable (not shown) is inserted into the opening portion 8 of the lower part 3. A magnetic field generating coil or bias magnet (not shown) is opposed to the outside half portion of the opening portion 7, whereas an optical pickup head (not shown) is opposed to the outside half portion of the opening portion 8.

As shown in FIG. 6, the coupling portions of the cartridge body 4 at the outer end portion sides of the openings 7 and 8 are reduced in thickness to provide thin portion surfaces 2a and 3a, and the thin portion surfaces 2a and 3a are lower than the outer surfaces (main planes) of the upper and lower parts 2 and 3. These lower surface portions 2a and 3a act as escape portions by which the disc cartridge 1 can be prevented from being disturbed by the optical head system when the disc cartridge 1 is loaded on a recording and/or reproducing apparatus (not shown). More specifically, if the optical disc D is the magneto-optical disc, the thin coupling portions 2a and 3a act as escape portions for the magnetic field generating coil (i.e., bias magnet) and the optical pickup head, whereby the surface of the magneto-optical disc can be made close to the magnetic field generating coil and the optical pickup head. Thus, the reduction of power consumed can be realized and heat generated by the coil can be reduced.

Figure 7:
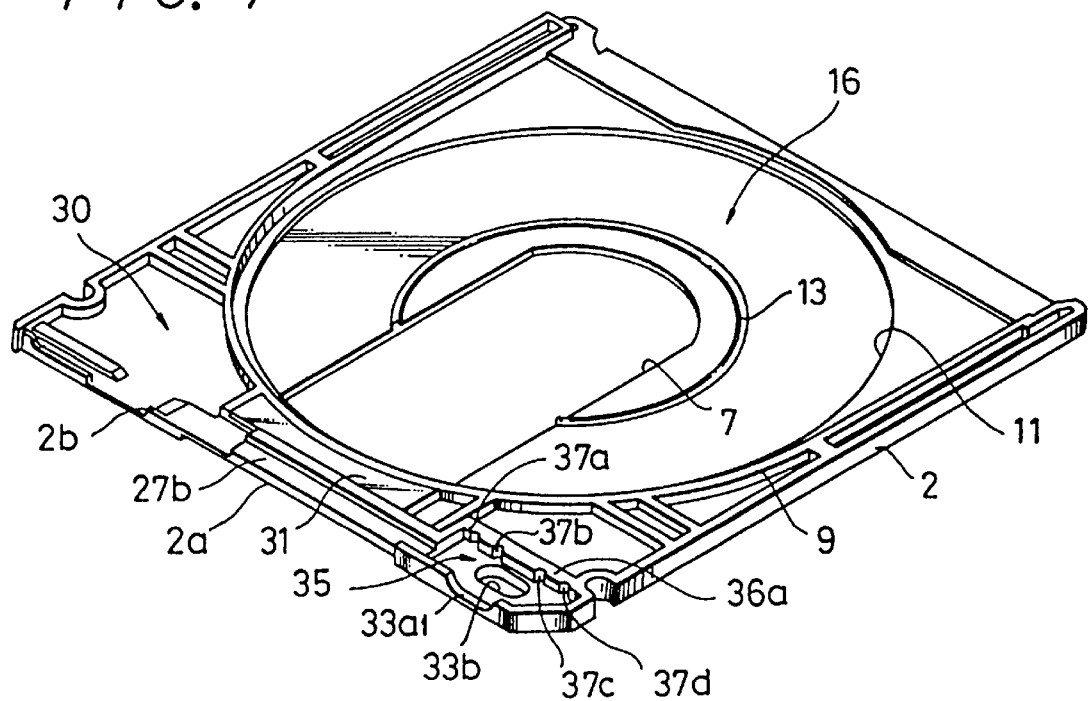
FIG. 7 is a perspective view illustrating the inside view side of the upper part or half of the disc cartridge of the present invention.
Figure 8:
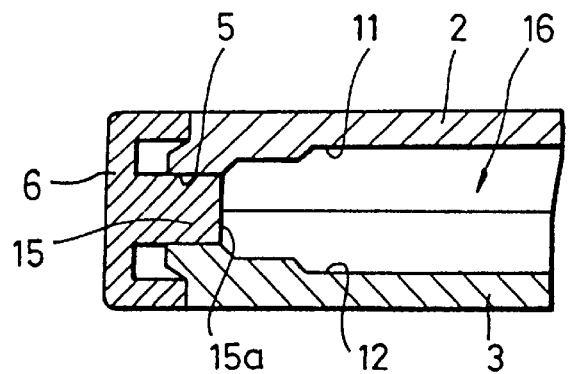
FIG. 8 is a fragmentary and enlarged cross-sectional view taken through the line A—A in FIG. 4.

As shown in FIGS. 6 and 7, on the inner surfaces of the upper and lower parts 2 and 3, semi-circular ribs 9 and 10 are formed, respectively. Each of the ribs 9 and 10 is shaped as a semicircular and is formed around the inner end portions of the opening portions 7 and 8, that is, the portions corresponding to the aforenoted chucking portion and whose diameter is slightly larger than the outer diameter of the accommodated optical disc D. The rear half portions of the ribs 9 and 10 are elongated from the two ends of the semicircular portions thereof in parallel to each other. Within the ribs 9 and 10, there are respectively formed circular recessed portions 11 and 12, the diameter of each of which is smaller than the outer diameter of the accommodated optical disc D as shown in FIG. 6 and 7. Further, within the circular recessed surfaces 11 and 12, there are respectively formed ribs 13 and 14 of a semicircular-shaped configuration, which have the arc-shape in cross section and the same heights as those of the outer peripheral surfaces of the recessed surfaces 11 and 12.

As shown in FIG. 6, an insertion plate 15 is unitarily formed with the inside surface of the lid 6 which closes the mouth portion 5 formed at the rear surface side between the upper and lower parts 2 and 3. The insertion plate 15 is inserted between the rear portions of the upper and lower parts 2 and 3. The inside surface side of the insertion plate 15 is formed as a recessed arcuate surface 15a which corresponds with the semicircular-shaped portions of the ribs 9 and 10. The recessed arcuate surface 15a and the ribs 9 and 10 abutting each other constitute a disc compartment portion 16.

The lid 6 is rectangular in shape so as to oppose the upper part 2 and is pivotally provided at one end of the rear edge portion of the lower part 3 so that the lid 6 can be rotated in the rearward.

As shown in, for example, FIG. 4, a slidable shutter 17 is slidably attached to the outer surface side of the cartridge body 4 so as to open and/or close the opening portions 7 and 8 of the upper and lower parts 2 and 3. As shown in FIGS. 4 and 6, a misrecording protection member 18 and a torsion spring 19 for urging the slidable shutter 17 to its closing direction are mounted on the inside at the front side of the cartridge body 4. Shutter guide members 20 and 21 are attached to the outer walls of the upper and lower parts 2 and 3, respectively, as shown in FIGS. 4 and 5.

Figure 1:
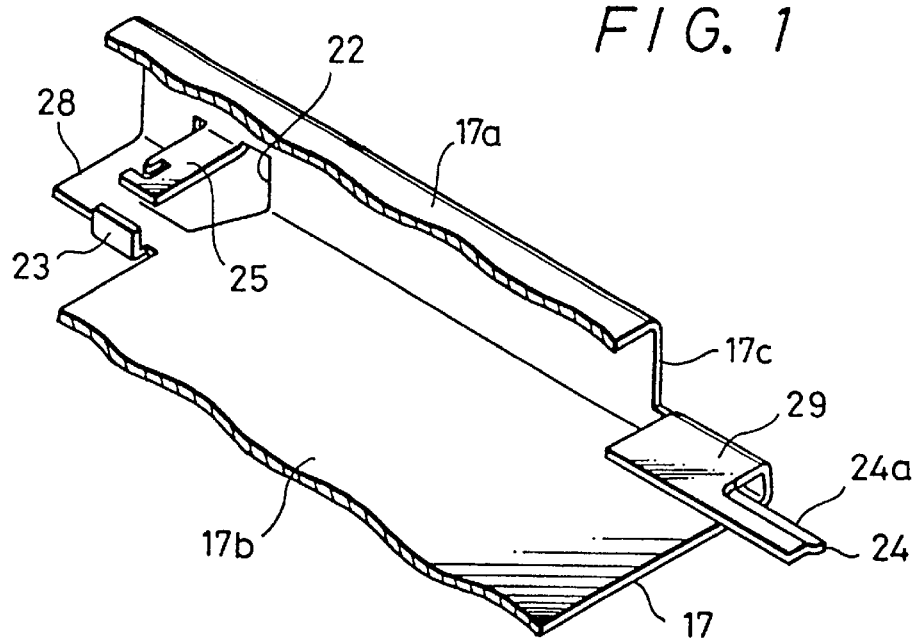
FIG. 1 is a schematic perspective view of a main portion of a slidable shutter which is suitably applied to the disc cartridge of the present invention.

The slidable shutter 17 is formed by bending a metal plate such as a stainless steel plate or the like and has a substantially U-shaped configuration in cross section. That is, as shown in FIGS. 1 and 6, the slidable shutter 17 is comprised of a first closing surface portion 17a that closes the opening portion 7 of the upper part 2, a second closing surface portion 17b that closes the opening portion 8 of the lower part 3 and a coupling surface portion 17c that couples the first and second closing surface portions 17a and 17b.

The thus constructed shutter 17 is in engagement from the front side to the outer wall side of the cartridge body 4 such that the first and second closing surface portions 17a and 17b are respectively extended over the opening portions 7 and 8 of the upper and lower parts 2 and 3. Also, as shown in FIGS. 4 and 5, top portions $17a_1$ and $17b_1$ of the two closing surface portions 17a and 17b are respectively inserted into guide grooves defined by the shutter guide members 20 and 21, whereby the slidable shutter 17 is allowed to slidably move on the flat surface portion of the cartridge body 4.

The slidable shutter 17 is spring-biased by the torsion spring 19 provided at one corner portion of the front side of the cartridge body 4 in such a manner as to always, move in the direction closing the opening portions 7 and 8 of the upper and lower parts 2 and 3. As shown in FIG. 6, an operation pin insertion engagement aperture 22 is formed through one end side of the coupling surface portion 17c. An operation pin of the recording and/or reproducing apparatus (not shown) is inserted into and engaged with this aperture 22, whereby the slidable shutter 17 is moved in its opened state. Accordingly, the slidable shutter 17 can be moved from the closing position that closes the opening portions 7 and 8 to the position in which the opening portions 7 and 8 are opened.

The shutter 17 is moved as described above, and is provided with first and second guide members 23 and 24 and an engaging member 25. The guide members 23 and 24 are adapted to make the shutter 17 engage with the cartridge body 4 and which is also used to realize the smooth slidable movement of the shutter 17. The engaging member 25 is adapted to engage one end of the torsion spring 19 therewith.

As illustrated, the guide members 23 and 24 are respectively in engagement with guide grooves 26 and 27 formed on the cartridge body 4, and the slidable shutter 17 is slidably moved along these guide grooves 26 and 27. The guide grooves 23 and 24 will be described more fully with reference, particularly, to FIG. 1.

The first guide member 23 protrudes at a right angle relative to the first closing surface portion 17a from an inner edge of a protruded member 28, while the second guide member 24 is elongated from a side portion of a supporting member 29 inwardly bent at a right angle (i.e., in parallel to the first and second closing surface portions 17a and 17b) at the other side of the coupling surface portion 17c, that is, at the side opposite to the side in which the first guide member 23 is formed. Further, the second guide member 24 has on its front portion a stepped portion 24a.

Figure 3:
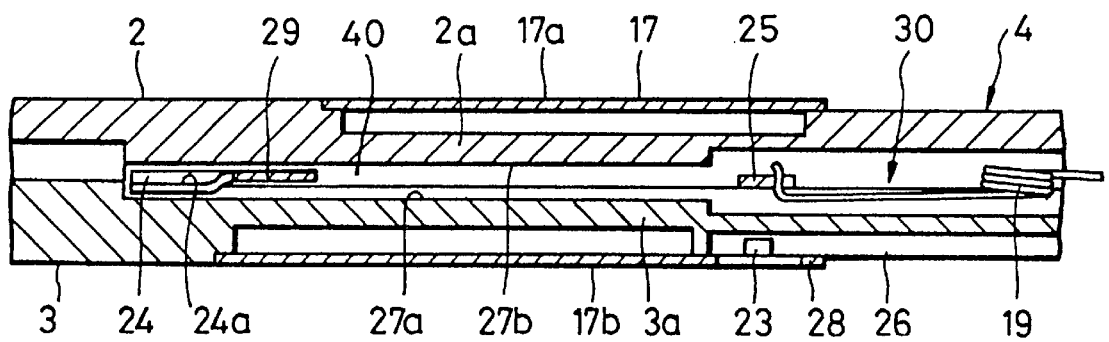
FIG. 3 is a transversal cross-sectional view of a main portion of the same embodiment of the disc cartridge according to the present invention.

As illustrated in FIG. 3, the first guide member 23 of the shutter 17 is engaged with the guide groove 26 which is formed on the lower main flat surface of the cartridge body 4, that is, the outer surface side of the lower part 3 in parallel to the front surface of the disc cartridge 4. The second guide member 24 is engaged with the guide groove 27 which is formed on the front side of the cartridge body 4, that is, between the front end faces of the upper and lower parts 2 and 3.

Figure 2:
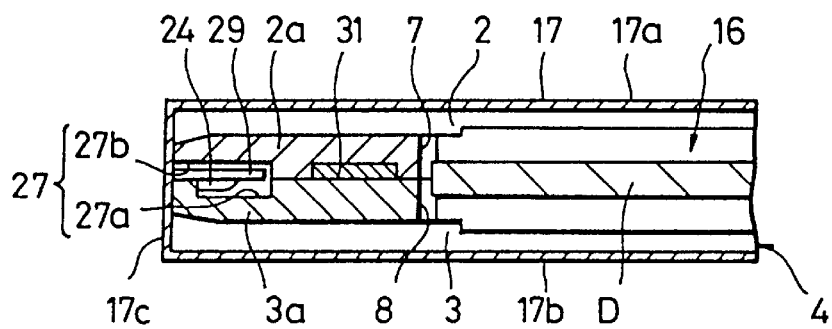
FIG. 2 is a fragmentary, longitudinal cross-sectional view of the main portion of an embodiment of the disc cartridge according to the present invention.

In the illustrated example of, for example, FIGS. 2 and 3, the guide groove 27 is comprised of an undercut-shaped recess portion 27a formed at the front end portion of the lower part 3, that is, the inner front edge of the front thin portion 3a of the opening 8 and a recess stepped surface 27b formed at the front edge portion of the upper part 2, that is, on the inner surface of the front thin portion 2a of the opening 7 in a range from the front end face to the portion corresponding to the recess portion 27a of the lower part 3. When the upper and lower parts 2 and 3 are secured together, the recess portion 27a and the recess stepped surface 27b constitute the guide groove 27.

As shown in FIG. 3, a slit portion 40 is formed on the guide groove 27 constructed between the front end portions of the upper and lower parts 2 and 3 by the recess stepped surface 27b, and the undercut-shaped recess portion 27a is formed in the inside of the slit portion 40. Thus, the supporting member portion 29 continuous to the second guide member 24 of the shutter 17 is inserted into the slit portion 40, whereby the second guide member 24 is engaged with the recess portion 27a to allow the front end edge of the stepped portion 24a of the guide member 24 to oppose the inside front surface of the recesss portion 27a as shown in FIG. 3.

As shown in FIG. 1, the engaging member 25 to which one end of the torsion spring 19 is engaged is inwardly bent at a right angle (i.e., in parallel to the first and second closing surface portions 17a and 17b) from the one side portion of the coupling surface portion 17c of the shutter 17, that is, from the intermediate portion of the side end portion opposing the first guide member 23.

This engaging member 25 is engaged with one end of the torsion spring 19 accommodated in one corner portion of the cartridge body 4. One end of the torsion spring 19 is accommodated within a hollow portion 30 defined by the front wall portions and the side wall portions of one corner portions of the upper and lower parts 2 and 3 and the arc-shaped portions of the ribs 9 and 10 and whose opening portion is formed by the cutaway recess portions 2b and 3b of the front wall portions of the upper and lower parts 2 and 3, the other end of the torsion spring 19 being engaged with the side wall portions of the upper and lower parts 2 and 3, thus urging the shutter 17 to always move in its closing direction.

In the shutter 17 attached to the cartridge body 4 as described above, the first guide member 23 is engaged with the guide groove 26 formed on the outer surface of the lower part 3 which forms one major surface of the cartridge body 4. The second guide member 24 is engaged with the guide groove 27 it is sandwiched between the front end portions of the upper and lower parts 2 and 3 in the front surface side of the cartridge body 4. In other words, under the condition that the supporting member portion 29 is placed in the slit portion 40 formed by the recess stepped surface 27b of the guide groove 27, the second engaging member 24 is placed on the undercut-shaped groove portion 27a and the end edge of the stepped portion 24a is engaged with the front inside surface of the recess portion 27a. Accordingly, the shutter 17 is engaged with the cartridge body 4 in the two directions perpendicular to each other, whereby the shutter 17 can be protected from coming out from the cartridge body 4 and can be stably and smoothly moved in the opening and/or closing direction of the opening portions 7 and 8. Thus, the optical disc D accommodated within the cartridge body 4 can be recorded and/or reproduced positively.

When the disc cartridge 1 is not in use, the shutter 17 is spring-biased by the force of the torsion spring 19 so that the opening portions 7 and 8 are always closed by the first and second closing surface portions 17a and 17b, respectively. There is then no risk that the user will touch the accommodated optical disc D inadvertently or unintentionally. Further, foreign substances, dusts or the like can be prevented from entering the cartridge body 4.

In the aforementioned structure, the undercut-shaped recess portion 27a of the guide groove 27 may be formed on the front inner surface of the upper part 2 and the recess stepped surface 27b by which the slit portion 40 is formed may be formed on the front inner surface of the lower part 3.

As shown in, for example, FIGS. 2 and 7, a rigid reinforcing member 31 made of a metal plate or the like is interposed between the front thin portions 2a and 3a of the upper and lower parts 2 and 3. In the illustrated example, the reinforcing member 31 is coupled between the front thin portions 2a and 3a in such a manner as to be buried in the inner surface of the front thin portion 2a of the upper part 2. Thus, even when the front sides of the upper and lower parts 2 and 3, that is, the outer end coupling portions of the opening portions 7 and 8 are formed as the thin portions 2a and 3a, the mechanical strength of the disc cartridge 1 can be prevented from being decreased.

The mis-recording protection member 18 is mounted to the cartridge body 4 at its portion near the front side and which is out of the movable range of the shutter 17. This will be described more fully.

As illustrated in, for example, FIGS. 4, 6, 9 and 10, the other corner portion of the front wall side of the cartridge body 4 has first, second and third detection apertures 33a, 33b and 33c with which first, second and third detected devices 32a, 32b and 32c of the mis-recording protection member 18 are engaged in an opposing relation.

Figure 10:
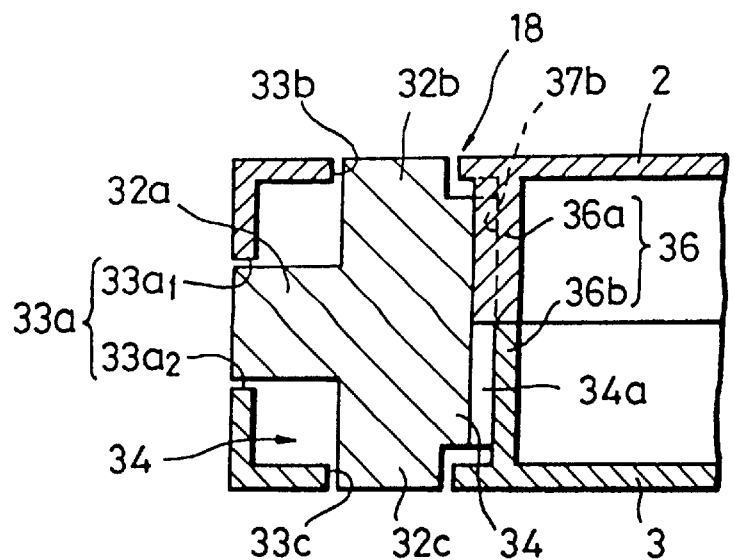
FIG. 10 is a fragmentary and enlarged cross-sectional view taken through the line B—B in FIG. 4.

The first detection aperture 33a is formed through the front side of the cartridge body 4 where it is not covered with the shutter 17, as shown in FIG. 4. In order to construct the first detection aperture 33a, cutaway concave portions $33_{a1}$ and $33_{a2}$ of recess-shaped configurations are respectively formed through the rising walls which form the front walls of the upper and lower parts 2 and 3 as shown in FIG. 10. The second detection aperture 33b is formed through the upper part 2 that constructs the upper wall, that is, one major surface of the cartridge body 4 and which is perpendicular to the front wall of the cartridge body 4. The third detection aperture 33c is provided on the lower part 3 forming the lower surface, that is, the other major plane of the cartridge body 4 and which is opposed to the second detection aperture 33b. The first, second and third detection apertures 33a, 33b and 33c are formed through different three surfaces of the cartridge body 4. The sizes of the first, second and third detection apertures 33a, 33b and 33c are selected such that the first, second and third detected devices 32a, 32b and 32c can be moved to first and second positions, respectively.

Figure 9:
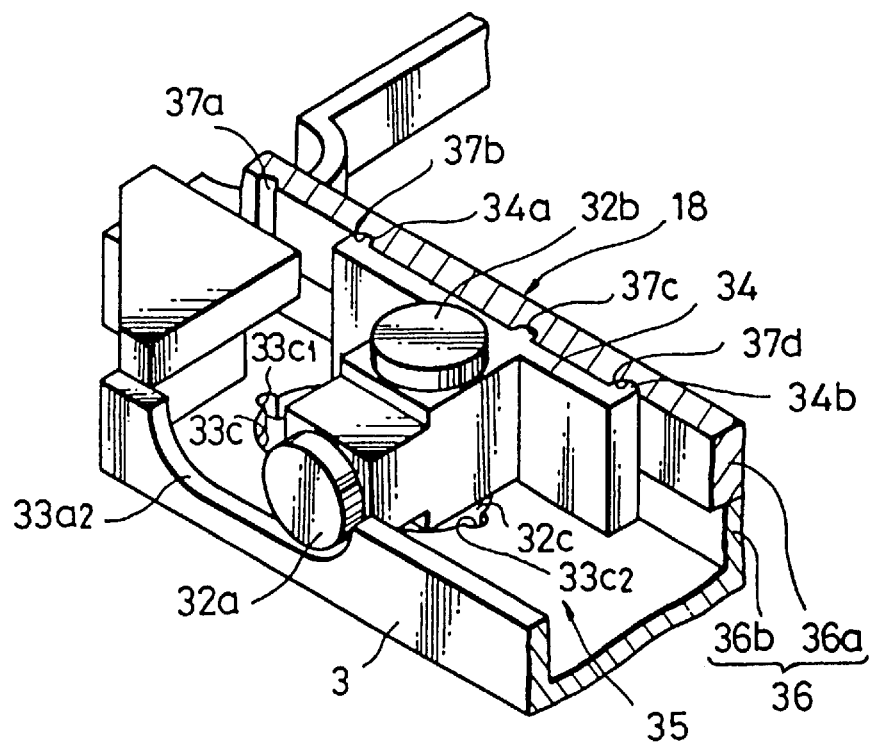
FIG. 9 is a perspective view of a mis-recording protection portion of the disc cartridge of the present invention.

As shown in FIGS. 9 and 10, the mis-recording protection member 18 integrally comprises the first, second and third detected devices 32a, 32b and 32c. The first, second and third detected devices 32a, 32b and 32c can be engaged, when the mis-recording protection member 18 is located within the cartridgge body 4, into the first, second and third detection apertures 33a, 33b and 33c, respectively. In other words, the first detected device 32a is protruded in such a fashion that it may be placed in the direction at a right angle relative to the direction of the second and third detected devices 32b and 32c which are communicated with each other in the vertical direction. There is provided a slide guide member 34 which can be resiliently displaced and has on its two ends engaging protrusions 34a and 34b. This slide guide member 34 is provided on the mis-recording protection member 18 at its base end side opposing the side from which the first detected device 32a is protruded.

The thus arranged mis-recording protection member 18 is located within an engaging recess portion 35 formed between the upper and lower parts 2 and 3 in such a manner that, as shown in FIG. 10, the first, second and third detected devices 32a, 32b and 32c thereof are inserted into the first, second and third detection apertures 33a, 33b and 33c, respectively. The size of the engaging recess portion 35 is sufficient so that it can movably support the mis-recording protection member 18. The first, second and third detected devices 32a, 32b and 32c may be moved within the first, second and third detection apertures 33a, 33b and 33c in the movable range of the first position and the second position. In the mis-recording protection member 18, the third detected device 32c is engaged with the third detection aperture 33c and is further engaged within the lower part 3 of the engaging recess portion 35. Under this condition, when the upper part 2 is fastened to the lower part 3, the slide guide member 34 is urged against a rear wall 36 of the engaging recess portion 35. Four engaged recess portions 37a, 37b, 37c and 37d are formed on a wall portion 36a of the real wall 36 at the upper part 2 side. The engaging protrusions 34a and 34b of the slide guide member 34 are selectively engaged with the four engaged recess portions 37a, 37b, 37c and 37d in unison with the movement of the first, second and third detected devices 32a, 32b and 32c to the first and second positions within the first, second and third detection apertures 33a, 33b and 33c.

The mis-recording protection member 18 is slidably operated to allow the engaging protrusions 34a and 34b to be selectively engaged with two of the four engaged recess portions 37a to 37d. Thus the first, second and third detected devices 32a, 32b and 32c are selectively held in the first or second position within the first, second and third detection apertures 33a, 33b and 33c. Insertion slots $33c_1$ and $33c_2$ are bored through two ends of the detection aperture, that is, the third detection aperture 33c in the illustrated example of FIG. 9 in order that the user can slide the mis-recording protection member 18 by utilizing daily necessaries such as a point of a ball-bearing pen or the like.

The mis-recording protection member 18 is slidably moved by depressing any one (the third detected device 32c in the illustrated example) of the first, second and third detected devices 32a, 32b and 32c, whereby the first, second and third detected devices 32a, 32b and 32c are selectively moved to the first position and the second position within the first, second and third detection apertures 33a, 33b and 33c. By changing the positions of the first, second and third detected devices 32a, 32b and 32c within the first, second and third detection apertures 33a, 33b and 33c, it is possible to identify and display the status of the disc cartridge 1, that is, whether the recording in the disc cartridge 1 is possible or the recording in the disc cartridge 1 is inhibited.

As shown in FIG. 5, positioning apertures 38 and 39 are bored through the lower part 3 which forms the cartridge body 4 at the two side portions of the outer surface side thereof. When the disc cartridge 1 is loaded on a disc loading portion within the recording and/or reproducing apparatus (not shown), positioning pins for determining the position of the disc cartridge 1 are engaged with these positioning apertures 38 and 39, respectively. That is, the mis-recording protection member 18 is provided near one positioning aperture 39 so that, when the disc cartridge 1 is loaded on the recording and/or reproducing apparatus (not shown), the mis-recordig protecting member 18 can be accurately positioned relative to a detecting apparatus provided at the recording and/or reproducing apparatus.

According to the disc cartridge thus arranged, since the first, second and third detected devices 32a, 32b and 32c are provided on the three different planes of the cartridge body 4, the detecting apparatus of the recording and/or reproducing apparatus can be located without being restricted in its mouting position.

In this disc cartridge of the present invention, the opening portions 7 and 8 must be opened by sliding the shutter 17 before the disc cartridge 1 is loaded on the predetermined loading position within the recording and/or reproducing apparatus so that the disc cartridge of this type is loaded on the recording and/or reproducing apparatus from its front wall side in which the shutter 17 is provided. The mis-recording protection member 18 is positioned at the front wall side in which the shutter 17 is provided as described above so that, when the disc cartridge is loaded onto the recording and/or reproducing apparatus, the position of any one of the first, second and third detectd devices 32a, 32b and 32c can be detected by the detecting apparatus of the recording and/or reproducing apparatus. Particularly, in a recording and/or reproducing apparatus which loads thereon a disc cartridge by utilizing a cartridge holder for loading the disc cartridge, the detecting apparatus can be provided within the cartridge holder, thus making it possible to detect a mis-recording readily.

While the mis-recording protection member 18 is provided on the front wall side of the cartridge body 4 as described above, the mis-recording protection member 18 may be provided at the corner portion of rear wall side opposing the front wall side at which the shutter 17 is slidably engaged. Even in the thus modified disc cartridge, the restriction on the position at which the detecting apparatus is provided in the recording and/or reproducing apparatus side can be removed.

If the first, second and third detected devices 32a, 32b and 32c are provided on one wall and one of the plane of the cartridge body 4, at least the detecting apparatus can be located on the side in which a disc drive apparatus is provided. Thus the mechanism of the abovementioned disc drive apparatus side can be simplified.

While the present invention is applied to the disc cartridge in which the disc-shaped record medium is accommodated as described above, the present invention is not limited thereto and can be applied to a cartridge in which a tape-shaped record medium such as a magnetic record medium or the like is accommodated, with similar action and effects being achieved.

Furthermore, the shapes, materials, sizes and positional relationships of the aforenoted members of the invention can be varied freely.

As set out above, according to the disc cartridge of the present invention, since the shutter slidably attached to the cartridge body for opening and/or closing the opening portions is provided with the pair of guide members and these guide members are independently engaged with the first guide grooves formed on the main surface of the cartridge body and with the second guide groove formed on the side wall of the cartridge body, the mechanical strength of the cartridge body itself can be prevented being decreased because the guide grooves are separately formed on the different wall portions.

Further, since the shutter is engaged with the cartridge body by the pair of guide members from the different directions, the shutter can be protected from coming out therefrom. Furthermore, the shutter can be stably and smoothly moved, whereby the opening portions can always be opened and/or closed by the shutter positively. Thus, the protection of the optical disc accommodated in the disc cartridge and satisfactory recording and/or reproducing operation can be assured, which provides the disc cartridge of high reliability.

Although a preferrred embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

We claim as our invention:

1. A disc cartridge comprising:

(a) a cartridge body comprising:

a pair of opposed major surfaces; and a plurality of side walls perpendicular to said major surfaces, said plurality of side walls interconnecting said pair of opposed major surfaces;

wherein a disc is rotatably accommodated inside the cartridge body, said major surfaces having an opening portion from which said disc is partially exposed to the outside, and wherein said major surfaces are substantially larger in area than each of said side walls; and (b) a shutter slidably attached to said cartridge body for exposing said opening portion when slid in an opening direction and for covering said opening portion when slid in a closing direction, wherein said shutter comprises:

a first guide member formed perpendicular to said major surfaces and engaged with a first guide groove formed on one of said major surfaces of said cartridge body;

a second guide member formed parallel to said major surfaces and engaged with a second guide groove formed on one side wall of said cartridge body; and an engaging member formed parallel to said major surfaces for engaging a biasing means, said biasing means urging said shutter in said closing position.

2. A disc cartridge according to claim 1, wherein said second guide groove is provided with protection means which, when engaged with said second guide member, protects said shutter from being disengaged from said cartridge body.

3. A disc cartridge according to claim 2, wherein said second guide member has a stepped portion formed thereon.

4. A disc cartridge according to claim 2, wherein said second guide groove has an undercut-shaped groove formed therein.

5. A disc cartridge according to claim 1, wherein said first guide groove is formed on the major surface of said cartridge body along said one opening and closing directions of said shutter.

6. A disc cartridge according to claim 1, wherein said first guide member is formed on an opening direction side of said shutter by a bending-process and said second guide member is formed on a closing direction side of said shutter by a bending-process.

7. A disc cartridge according to claim 1, wherein said first guide groove traverses only a fraction of said one major surface and wherein said shutter is prevented from moving any further in said opening direction when said first guide member engages an end of said first guide groove.

8. A disc cartridge according to claim 1, wherein said second guide groove has a stepped portion formed perpendicular to said major surfaces, said second guide member has a stepped portion formed perpendicular to said major surfaces, and wherein said stepped portion of said second guide member engages said stepped portion of said second guide groove when said shutter is moved in a direction perpendicular to said opening and closing directions and in a direction away from said cartridge body.

9. A disc cartridge according to claim 1, wherein said biasing means comprises a torsion spring having one end attached to said engaging member and a second end attached to a corner of said cartridge body.

10. A disc cartridge according to claim 1, wherein said first guide member and said engaging member are formed at one end of said shutter and said second guide member is formed at a second end of said shutter opposite said one end.

11. A disc cartridge comprising:

a cartridge body which accommodates a rotatable disc, said cartridge body including a pair of opposed major surfaces, and a plurality of side walls perpendicular to said major surfaces, said plurality of side walls interconnecting said pair of opposed major surfaces, said major surfaces having an opening portion from which said disc is partially exposed to the outside, and wherein said major surfaces are substantially larger in area than each of said side walls; and a shutter slidably attached to said cartridge body for exposing said opening portion when slid to an open position and for covering said opening portion when slid to a closed position, said shutter having a U-shaped configuration including an edge portion which seats on a side wall of said cartridge body, and a pair side members which are contiguous with said edge portion and which overlay said major surfaces of said cartridge body, said pair of side members each having a free end;

a first guide member formed on said shutter perpendicular to said major surfaces and engaged with a first guide groove formed on one of said major surfaces of said cartridge body;

a second guide member formed on said shutter parallel to said major surfaces and engaged with a second guide groove formed on one side wall of said cartridge body;

a pair of third guide members each formed at a free end of the U-shaped shutter, and each slidably received in a groove formed in a major surface of said cartridge.

12. A disc cartridge comprising:

first and second halves which enclose a rotatable disc, said first and second halves respectively having first and second major surfaces in which first and second opening portions are formed;

a substantially U-shaped cross-sectional shutter which slides along an edge of said cartridge and which has first and second closure surface portions which respectively extend over the first and second major surfaces, said shutter having first and second guide members and an engaging member, said first and second guide members being slidably received in first and second guide grooves which are formed in the cartridge body, said first groove being formed in one of said first and second major surfaces, said second groove being formed in the edge of said cartridge between said first and second halves, said first guide member protruding from a portion of one of said first and second closure surface members, said second guide member being elongated and extending from a support member which is bent inwardly at right angles so as to be parallel with said first and second closure surface portions, said second guide member being interconnected with said supporting member by a stepped portion, and said engaging member being bent inwardly at right angles so as to be parallel with said first and second closure surface portions at a location proximate said first guide member; and a torsion spring having a first end connected with said engaging member and a second end connected with a portion of said casing, said torsion spring biasing said shutter to a position wherein said first and second closure surface portions close said first and second opening portions.

* * * * *

UNITED STATES PATENT AND TRADEMARK OFFICE
CERTIFICATE OF CORRECTION

PATENT NO. : 5,991,129
DATED : November 23, 1999
INVENTOR(S) : Hirokimi IWATA et al.

It is certified that error appears in the above-identified patent and that said Letters Patent is hereby corrected as shown below:

Column 10, line 53 et seq., claim 5 should read as follows:

A disc cartridge according to claim 1, wherein said first guide groove is formed on said one major surface of said cartridge body along the opening and closing directions of said shutter.

Signed and Sealed this

Eighteenth Day of July, 2000

Attest:

Q. TODD DICKINSON

*Attesting Officer*  *Director of Patents and Trademarks*